United States Patent [19]

Kakugo et al.

[11] Patent Number: 5,043,408

[45] Date of Patent: Aug. 27, 1991

[54] ETHYLENE-AROMATIC VINYL COMPOUND ALTERNATING COPOLYMER AND PROCESS FOR THE PRODUCTION THEREOF

[75] Inventors: Masahiro Kakugo, Narashino; Tatsuya Miyatake, Ichihara; Koozi Mizunuma, Ichihara; Yoshio Yagi, Ichihara, all of Japan

[73] Assignee: Sumitomo Chemical Company, Limited, Osaka, Japan

[21] Appl. No.: 538,713

[22] Filed: Jun. 15, 1990

[30] Foreign Application Priority Data

Jun. 26, 1989 [JP] Japan .................................. 1-162932
Jan. 31, 1990 [JP] Japan .................................. 2-023426

[51] Int. Cl.$^5$ ...................... C08F 210/02; C08F 4/622
[52] U.S. Cl. .................................. 526/347; 526/139; 526/140; 526/141; 526/142; 526/128; 526/346
[58] Field of Search .............. 526/139, 140, 141, 142, 526/347, 128, 346

[56] References Cited

U.S. PATENT DOCUMENTS

| | | | |
|---|---|---|---|
| 3,117,945 | 1/1964 | Gorham et al. | 526/347 X |
| 3,174,958 | 3/1965 | Solvik et al. | 526/347 X |
| 3,864,319 | 2/1975 | Gaylord | 526/347 X |
| 4,577,001 | 3/1986 | Coleman et al. | 526/142 X |

FOREIGN PATENT DOCUMENTS 8101289 5/1981 European Pat. Off. ............ 526/160
58-11511 1/1983 Japan .

OTHER PUBLICATIONS

Polymer Bulletin, 20, (1988), 237–241.
Macromolecules, 13, (1980), 849–852.

Primary Examiner—Fred Teskin
Attorney, Agent, or Firm—Stevens, Davis, Miller & Mosher

[57] ABSTRACT

Alternating copolymers having a high alternating degree and high isotacticity, which can be produced by copolymerizing ethylene and an aromatic vinyl monomer in the presence, as a catalyst, of a transition metal compound, aluminoxane and a specific organic compound having at least two hydroxyl groups.

15 Claims, 7 Drawing Sheets

F I G. 2
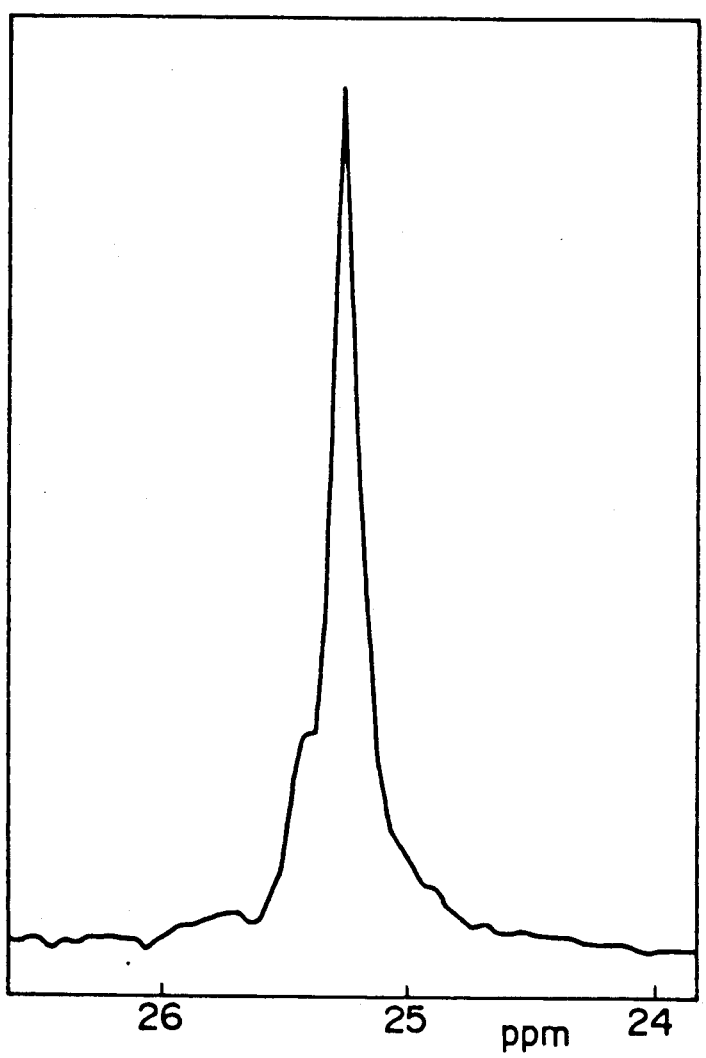

FIG. 8

(A) TRANSITION METAL COMPONENT $M(R)_l(OR')_m X_{n-(l+m)}$

X; HALOGEN ATOM

R, R'; HYDROCARBON GROUP HAVING 1 TO 20 CARBON ATOMS

WHEN $l$, m AND n ARE NUMERALS DEFINED BY $l \geq 0$, $m \geq 0$ AND $n-(l+m) \geq 0$, n CORRESPONDS TO THE VALENCE OF THE TRANSITION METAL (C) THIRD COMPONENT

ORGANIC COMPOUND HAVING AT LEAST TWO-HYDROXYL GROUPS (B) ORGANIC ALUMINUM COMPOUND

ALUMINOXANE

REACTION → POLYMERIZATION → ETYLENE-AROMATIC VINYL COMPOUND ALTERNATING COPOLYMER

ETHYLENE-AROMATIC VINYL COMPOUND ALTERNATING COPOLYMER AND PROCESS FOR THE PRODUCTION THEREOF

This invention relates to an ethylene-aromatic vinyl compound alternating copolymer and a process for the production thereof.

More particularly, it relies to a process for producing an ethylene-aromatic vinyl compound alternating copolymer comprising using a catalyst composed of a transition metal compound, an aluminoxane and an organic compound having at least two hydroxyl in the molecule, and an ethylene-aromatic vinyl compound alternating copolymer produced by the process which copolymer mainly has an isotactic structure.

It is heretofore known that an ethylene-styrene copolymer can be obtained by a polymerization process using a Ziegler catalyst (e.g. JP-A-58-1151 or Polymer Bulletin 20, 237–241 (1988), Soga et al.). The copolymer obtained according to this process has a low styrene content.

On the other hand, it is known that an ethylene-styrene alternating copolymer can be produced by the hydrogenation of 1,4-poly(1-phenylbutadiene) or 1,4-poly(2-phenylbutadiene) (Macromolecules, 13, 849–852 (1980)). And, it is also known that the stereostructure of the alternating copolymer obtained by this hydrogenation is a tactic or slightly syndiotactic.

As described above, the production process for ethylene-styrene copolymers and the polymer structure thereof have been reported. However, there has not been reported a highly alternating ethylene-styrene copolymer produced with a Ziegler-Natta catalyst In addition, no copolymer having isotactic structure has been known in the art.

It is therefore an object of this invention to provide a process for producing an ethylene-aromatic vinyl compound copolymer having a high alternating degree and a wide range of tacticity, which process comprises using a catalyst composed of a transition metal compound, an aluminoxane and an organic compound having at least two hydroxyl in the molecule, and an ethylene-aromatic vinyl compound copolymer having a high alternating degree and an isotactic structure produced by the process.

SUMMARY OF THE INVENTION

According to the present invention, there are provided:

an ethylene-aromatic vinyl compound alternating copolymer which mainly has the recurring unit,

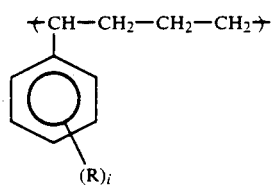

wherein R is hydrogen, halogen or an alkyl having 1 to 12 carbon atoms, and i is an integer of from 1 to 3, and whose steric regularity is isotactic in structure, and a process for the production of the ethylene-aromatic vinyl compound alternating compound which comprises copolymerizing ethylene and an aromatic vinyl compound in the presence of a catalyst comprised of:

a catalyst component (A) which is a transition metal compound having the formula $M(R)_l(OR')_mX_{n-(l+m)}$ in which M is transition metal, R and R' are independently a hydrocarbon group having 1 to 20 carbon atoms, X is halogen, (, m and n are numerals defined by $l \geqq 0$, $m \geqq 0$ and $n-(l+m) \geqq 0$, and n equals the valance of the transition metal, a catalyst component (B) which is an aluminoxane, and, a catalyst component (C) which is an organic compound having at least two hydroxyls and having any of the formulae (I), (II), (III), (IV), (V) or (VI)

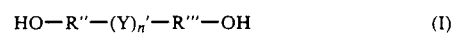

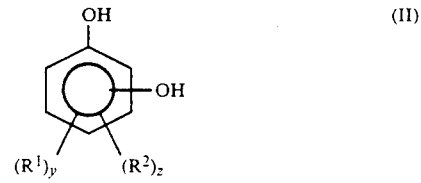

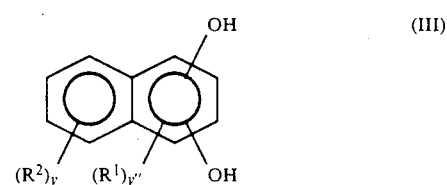

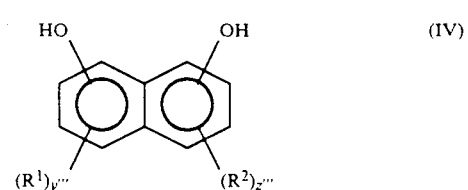

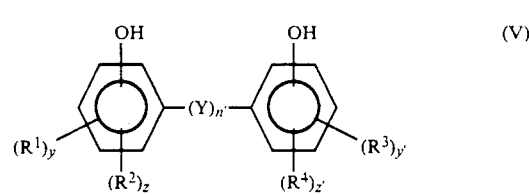

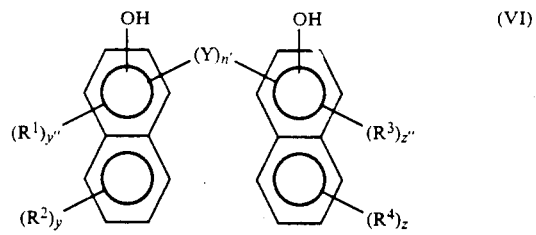

wherein R" and R''' are independently a hydrocarbon group having 1 to 20 carbon atoms, Y is a hydrocarbon group having 1 to 20 carbon atoms, -O-, -S-, -S-S-,

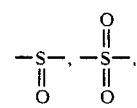

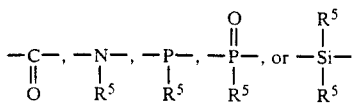

in which R⁵ in which R5 is hydrogen or a hydrocarbon group having 1 to 6 carbon atoms; $R^1$, $R^2$; $R^3$ and $R^4$ are independently a hydrocarbon group having 1 to 20 carbon atoms, hydroxyl, nitro, nitrile, hydrocarbyloxy or halogen; n' is an integer of 0, 1 or more and represents a number of repetition of the unit Y; y, y', y", y"', z, z', z" and z"' are independently a number of the substituents attached to the aromatic ring; y, y', z and z' are independently an integer of from 0 to 4; y" and z" are independently an integer of from 0 to 2; and y"' and z"' are independently an integer of from 0 to 3.

BRIEF DESCRIPTION OF THE DRAWINGS

FIG. 2 shows a $^{13}$C-NMR spectrum of the chloroform-soluble portion, at a chemical shift of 25.2 ppm, of the copolymer obtained in Example 1.

FIG. 8 shows a flow chart of a typical embodiment of this invention for easier understanding. However, this invention should not be interpreted to be limited thereto.

DETAILED DESCRIPTION OF THE INVENTION

Figure 1:
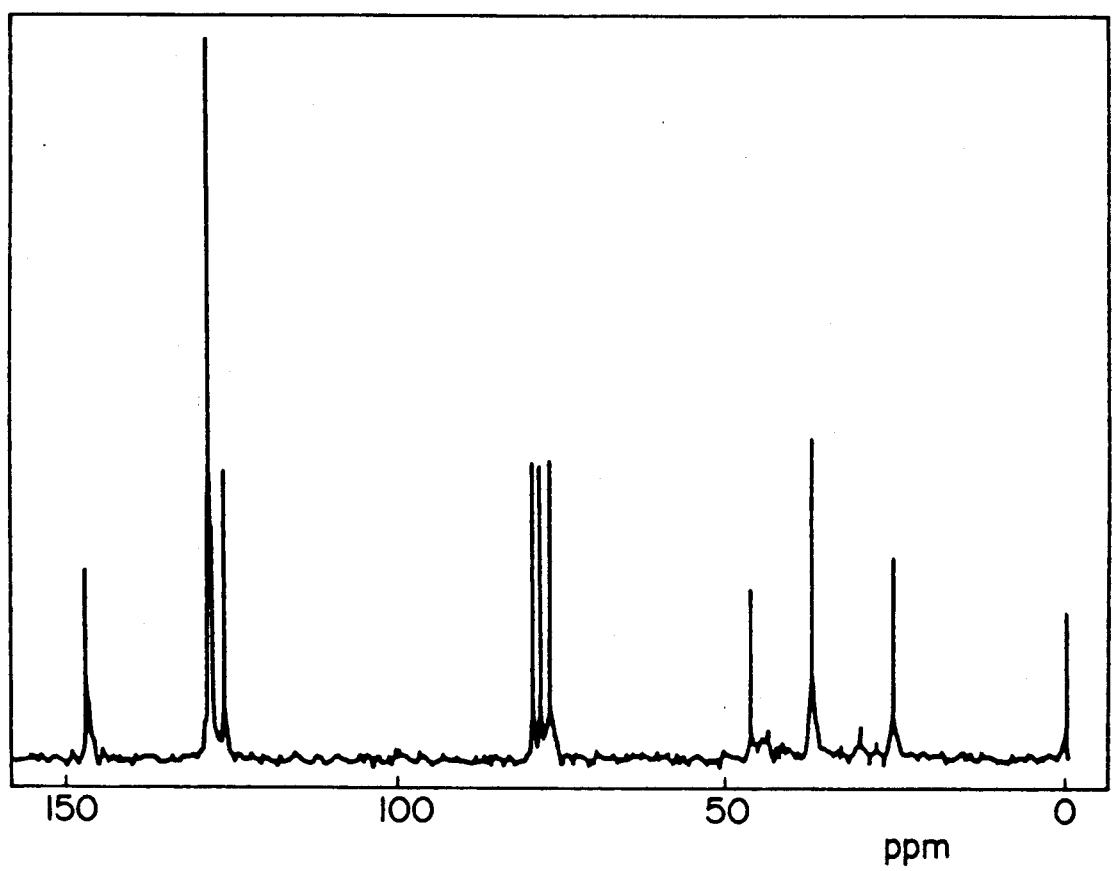
FIG. 1 shows a $^{13}$C-NMR spectrum of the chloroform-soluble portion of the copolymer obtained in Example 1.

This invention is based on the finding that an unconventional ethylene-aromatic vinyl compound copolymer having a high alternating degree and isotacticity can be unexpectedly obtained by copolymerizing ethylene and an aromatic vinyl compound in the presence of a catalyst formed by using a combination of a transition metal compound, an organic compound having at least two hydroxyl groups and aluminoxane.

The ethylene-aromatic vinyl compound alternating copolymer means a polymer composed mainly of ethylene and a vinyl monomer which alternate. Of ethylene-aromatic vinyl compound alternating copolymers, the copolymer of this invention is characteristic in mainly having an isotactic structure and a high alternating degree and steric regularity.

The alternating degree and the steric regularity are determined by a nuclear magnetic resonance method (NMR method). Macromolecules 13, 849–852 (1980) by Suzuki et al has reported the details of $^{13}$C-NMR spectrum analysis of ethylene-styrene copolymers on the basis of assignment of signals of main chain methylene and methyne carbons and assignment of signals of aromatic $C_1$ carbons by $^{13}$C-NMR (nuclear magnetic resonance spectrum using isotopic carbons). That is, when the alternating degree is 100%, the signals of main chain methylene and methyne carbons are observed at three chemical shift regions of (25.2, 25.4) ppm, (36.6, 36.7, 36.9, 37.0) ppm and (45.4, 45.5, 45.6) ppm.

The features of the ethylene-aromatic vinyl compound alternating copolymer according to this invention are that it gives peaks at all of these three chemical shift regions, and that the peak area of these regions is not less than 70% of the total peak area of the main chain methylene and methyne carbons.

The term "mainly has an isotactic structure" in this invention means that the isotactic diad (m) is not less than 0.55. The isotactic diad (m) is determined, e.g. by m/(m+r) in peak areas of m and r (25.2, 25.4 ppm) in FIG. 2 on page 851 of the above literature.

Actually, the ethylene-aromatic vinyl compound alternating copolymer of this invention is not necessarily a completely alternating copolymer. It is an alternating copolymer which has portions where ethylene and an aromatic vinyl monomer do not alternate but has an isotactic diad m of not less than 0.55, preferably not less than 0.65 as a whole.

The alternating copolymer of this invention may be mixed with a conventional ethylene-aromatic vinyl alternating copolymer. It is also possible to mix two or more of the alternating copolymers of this invention having different molecular weights.

It is further possible to synthesize a block copolymer containing the alternating copolymer of this invention in the polymer chain.

The isotactic ethylene-aromatic vinyl alternating copolymer of this invention as described above can be used as a starting material for producing a product having a desired alternating degree and regularity by polymerization, or by application of fractionation, blending or an organic synthesis method to the copolymer(s) so obtained.

As to the transition metal compound as the catalyst component (A), which has the formula of $M(R)_l(OR')_mX_{n-(l+m)}$, specific examples of M are titanium, zirconium, hafnium and vanadium. In particular, each of titanium and zirconium gives a satisfactory result.

R and R' each represent a hydrocarbon group having 1 to 20 carbon atoms, and each of these is preferably an alkyl group having 2 to 18 carbon atoms or an aryl group having 6 to 18 carbon atoms.

Specific examples of R and R' are alkyl groups such as methyl, ethyl, n-propyl, isopropyl, n-butyl, isobutyl, t-butyl, n-amyl, isoamyl, n-hexyl, n-heptyl, n-octyl, n-decyl, n-dodecyl, etc., aryl groups such as phenyl, naphthyl, etc., cycloalkyl groups such as cyclohexyl, cyclopentyl, etc., allyl groups such as propenyl, aralkyl groups such as benzyl, etc., and the like.

Of these, methyl, ethyl, phenyl and benzyl groups are preferably used as R, and alkyl groups such as n-propyl, isopropyl, n-butyl, t-butyl, etc., and aryl groups such as phenyl, etc., are preferably used as R'.

Specific examples of the halogen atom represented by X are chlorine, bromine and iodine. In particular, chlorine is preferable.

Specific examples of the catalyst component (A) are titanium tetrachloride, zirconium tetrachloride, tetraisopropoxytitanium, tetra-n-butoxytitanium, tetra-t-butoxytitanium, diphenoxytitanium dichloride, dinaphthoxytitanium dichloride, tetraisopropoxyzirconium, tetra-n-butoxyzirconium and tetra-t-butoxyzirconium. Of these, tetraisopropoxytitanium is preferred.

The aluminoxane as the catalyst component (B) is a polymer of an aluminum compound, and is present as a linear compound of the formula $R_a(Al(R_a)O)_nAlR_{a2}$, a cyclic compound of the formula $(Al(R_a)O)_{n+1}$ or a mixture of these. In these formulae, $R_a$ is an alkyl group having 1 to 10 carbon atoms such as methyl, ethyl, propyl, pentyl, or the like; preferably methyl and ethyl groups, and more preferably methyl group. The "n" is an integer of not less than 1, and preferably 1 to 20.

The aluminoxane can be obtained according to various known methods. For example, it can be synthesized by bringing a solution of trialkylaluminum in a suitable hydrocarbon solvent into contact with water. In this case, it is preferable to bring water into contact with the aluminum compound under moderate conditions. Alternatively, the aluminoxane can be synthesized by bringing steam into contact with an aluminum compound, by gradually adding a water saturated organic solvent by drops to a solution of an aluminum compound, or by some other methods. Alternatively, it can be synthesized by allowing hydrated copper sulfate ($CuSO_4 \cdot 5H_2O$) or hydrated aluminum sulfate ($Al_2(SO_4)_3 \cdot 18H_2O$) to react with an aluminum compound.

For example, when the aluminoxane is synthesized from trimethylaluminum and water, a linear compound and a cyclic compound are formed simultaneously. The molar ratio of water to aluminum compound for the reaction is usually 1:1.

In the compound used as the catalyst component (C) in this invention, represented by any one of the following formulae,

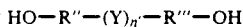

(I)

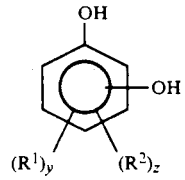

(II)

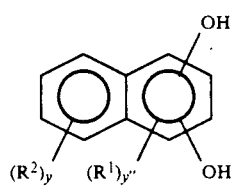

(III)

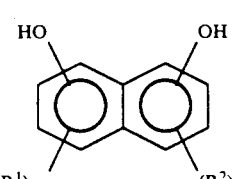

(IV)

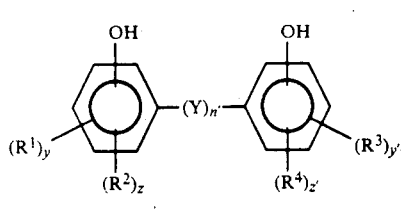

(V)

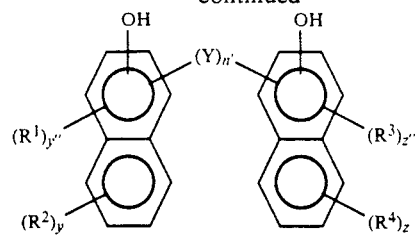

(VI)

R″ and R‴ each are a hydrocarbon group having 1 to 20 carbon atoms; and Y represents a hydrocarbon group having 1 to 20 carbon atoms, -O-, -S-, -S-S-,

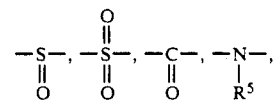

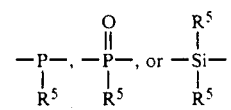

in which $R^5$ represents hydrogen or a hydrocarbon group having 1 to 6 carbon atoms. Specific examples of the hydrocarbon group having 1 to 20 carbon atoms, represented by R″, R‴ or Y, are methylene, ethylene, trimethylene, propylene, diphenylmethylene, isopropylidene, ethylidene, n-propylidene, n-butylidene, isobutylidene, etc. Of these, methylene, ethylene, ethylidene, isopropylidene and isobutylidene groups are preferable.

In the above formulae, n' is an integer of 0, 1 or more, and represents a number of repetition of the unit Y. In particular, when n' is 0 or 1, a satisfactory result can be obtained.

$R^1$, $R^2$, $R^3$ and $R^4$ each represent a hydrocarbon group having 1 to 20 carbon atoms, a hydroxyl group, a nitrile group, a hydrocarbyloxy group or a halogen atom. Specific examples of the hydrocarbon group having 1 to 20 carbon atoms are alkyl groups such as methyl, ethyl, n-propyl, isopropyl, n-butyl, isobutyl, t-butyl, n-amyl, isoamyl, n-hexyl, n-heptyl, n-octyl, n-decyl, n-dodecyl, etc., aryl groups such as phenyl, naphthyl, etc., cycloalkyl groups such as cyclohexyl, cyclopentyl, etc., allyl groups such as propenyl, etc., and aralkyl groups such as benzyl, etc. Of these, alkyl groups having 1 to 10 carbon atoms are preferably used.

The symbols y, y′, y″, y‴, z, z′, z″ and z‴ each represent a number of substituents attached to the aromatic ring. The symbols y, y′, z and z′ each represent an integer of from 0 to 4, y″ and z″ each represent an integer of from 0 to 2, and y‴ and z‴ each represent an integer of from 0 to 3.

Specific examples of the catalyst component (C) are 2,4-dihydroxypentane, 2-(2-hydroxypropyl)phenol, catechol, resorcinol, 4-isopropylcatechol, 3-methoxycatechol, 1,8-dihydroxynaphthalene, 1,2-dihydroxynaphthalene, 2,2′-biphenyldiol, 1,1′-bi-2-naphthol, 2,2-dihydroxy-6,6′-dimethylbiphenyl, 4,4′,6,6′-tetra-t-butyl-2,2′-methylenediphenol, 4,4′-dimethyl-6,6′-di-t-butyl-2,2′-methylenediphenol, 4,4′,6,6′-tetramethyl2,2′-isobutylidenediphenol, and 2,2′-dihydroxy-3,3′-di-t-butyl-5,5′-dimethyldiphenylsulfide. Of these, preferable are 2,4′-dihydroxypentane, catechol, 2,2′-biphenyldiol, 1,1'-bi-2-naphthol, 4,4',6,6'-tetra-t-butyl-2,2'-methylenediphenol, 4,4'-dimethyl-6,6'-di-t-butyl-2,2'-methylenediphenol, 4,4',6,6'-tetramethyl2,2'-isobutylidenediphenol and 2,2'-dihydroxy-3,3'-di-t-butyl-5,5'-dimethyldiphenylsulfide. In particular, 2,2'-dihydroxy-3,3'-di-t-butyl-5,5'-dimethyldiphenylsulfide is preferred.

The catalyst system of these components (A), (B) and (C) itself can be directly applied to alternating copolymerization of ethylene and an aromatic vinyl compound. It is however preferable to allow the catalyst component (A) to react with the catalyst component (C) before the copolymerization.

The reaction of the components (A) and (C) can be carried out usually in a polar solvent such as a hydrocarbon, hydrocarbon halide, ether, or the like at a temperature between $-20°$ C and $+200°$ C. The catalyst component (C) may be allowed to directly react with the catalyst component (A). When the catalyst component (A) is a halogen-containing transition metal compound, it is also possible to add ammonia, pyridine, alkylamine, or the like to the reaction system in order to catch hydrogen halide generated during the reaction. In this case, it is preferable to remove a precipitated compound containing hydrogen halide before the use of the reaction product as a catalyst for the polymerization.

Further, the catalyst component (C) may be allowed to react with an alkali metal such as metallic sodium or alkali metal hydride such as lithium hydride to form metal alcoholate, metal phenolate, metal naphtholate, or the like before the reaction with the catalyst component (A). In this case, it is preferable to remove a precipitated alkali metal salt before use. Further, when the catalyst component (A) contains a hydrocarbyloxy group, the catalyst component (C) can be allowed to react with a carboxylic acid such as acetic acid, or the like to form an ester compound before the reaction with the catalyst component (A).

In addition, it is assumed that the reaction between the transition metal compound and the organic compound having at least two hydroxyl groups in the molecule forms a compound wherein at least two hydroxyl groups of the organic compound are bonded to the same transition metal atom.

The amounts of the individual catalyst components for use in the copolymerization of ethylene and an aromatic vinyl monomer are not critical. However, the amount of the catalyst component (A) as a transition metal atom is usually in the range of $10^{-10}$ to $10^3$ mmol/l, preferably $10^{-7}$ to $10^2$ mmol/l. The amount ratio of the catalyst component (B) to the catalyst component (A) is usually 1 : 100,000, preferably 10 : The molar ratio of the catalyst component (C) to the transition metal atom in the catalyst component (A) is usually 0.01 : 1 to 4 : 1.

Specific examples of the aromatic vinyl compound used in this invention are styrene, o-methylstyrene, m-methylstyrene, p-methylstyrene, o,p-dimethylstyrene, o-ethylstyrene, m-ethylstyrene, p-ethylstyrene, o-chlorostyrene, α-methylstyrene, and the like. However, the aromatic vinyl compound of this invention shall not be limited to these. Of these, styrene and methyl styrene are preferred.

The polymerization method is not critical, either. For example, the following may be used as a solvent: Aliphatic hydrocarbons such as butane, pentane, hexane, heptane, octane, etc., aromatic hydrocarbons such as benzene, toluene, etc., hydrocarbon halides such as methylene chloride, etc. Further, the aromatic vinyl compound as a monomer may be used as a solvent. As a polymerization method, both a batch method and a continuous polymerization method can be employed.

The polymerization temperature may be in the range between $-50°$ C and $+200°$ C. In particular, the temperature range between $-20°$ C and $+100°$ C is preferable. Such a polymerization method can give the desired copolymer having nearly 100% alternating degree if by-products are removed by extraction.

A mixture having an alternating degree and regularity as desired can be also obtained by blending according to a known, conventional method an isotactic copolymer having such a high alternating degree and isotacticity with, for example, an ethylene-styrene random copolymer.

Further, it is well known to introduce a variety of substituents onto the benzene ring in styrene unit according to organic synthesis methods such as chloromethylation. According to these methods and on the basis of the ethylene-aromatic vinyl compound alternating copolymer of this invention, it is possible to produce ethylene-aromatic compound alternating copolymers having a variety of substituents on their aromatic rings while the alternating degree and regularity are maintained.

The advantageous effects of this invention will be more specifically explained by reference to Examples, which however shall not be interpreted to limit this invention.

The molecular weights described in Examples refer to weight average molecular weights of polystyrenes calculated according to gel permeation chromatography (GPC) with a chromatograph model 150C supplied by Waters Inc. The GPC was carried out at 140° C by using o-dichlorobenzene as a solvent. Two Shodex 80M/S columns were used. Fourteen kinds of monodisperse polystyrenes having a molecular weight in the range of from 500 to $6.8 \times 10^6$ were used to prepare a calibration curve.

$^{13}$C-NMR spectra were measured at 50° C. by using an FX-100 spectrometer supplied by Nippon Denshi Inc. The polymers were dissolved in chloroform. The NMR spectra were assigned by reference to assignments of Macromolecules, 13, 849–852 (1980). X-ray diffraction patterns were measured with Shimadzu VD-2 at an X-ray wavelength of 1.5418Å at 25° C.

EXAMPLE 1

(1) Reaction between catalyst components (A) and (C)

A flask having an internal volume of 100 ml and being equipped with a stirrer was charged with 0.9 mmol of 2,2'-dihydroxy-3,3'-di-t-butyl-5,5'-dimethyldiphenyl sulfide. The air in the flask was substituted with argon. Then, 50 m( of dry toluene was added to the sulfide and the sulfide was dissolved in toluene by stirring the resulting mixture. 0.9 Millimole of tetraisopropoxytitanium was added to the stirred mixture, and the resultant mixture was allowed to react at 25° C while stirring for 6 hours. Then, the reaction mixture was left to stand. From the mixture, supernatant was removed to recover precipitate. The precipitate was then washed. Part of the precipitate was dissolved in toluene to prepare a solution containing 0.008 mmol/m( of Ti.

(2) Synthesis of catalyst component (B)

The air in a flask having an internal volume of 1 ( and being equipped with a stirrer was substituted with argon. Then, 700 ml of toluene and 48 ml of trimethylaluminum were charged into the flask, and the temperature inside the flask was cooled to 5° C. 8 Milliliters of water was blown into the flask together with argon over 6 hours while stirring the mixture. Thereafter, the stirring was continued at room temperature for 30 hours. Then, the solvent was removed under reduced pressure to give 30 g of methylaluminoxane.

This aluminoxane was used in Examples hereinafter.
(3) Alternating copolymerization between ethylene and styrene The air in a flask having an internal volume of 100 ml and being equipped with a stirrer was substituted with argon. Then, 400 ml of toluene and 5 g of the methylaluminoxane obtained in (2) were charged into the flask, and then, 10 ml of the solution prepared in (1) was added. After the temperature inside the flask had been elevated to 80° C, 20 ml of styrene was added, and the flask was pressurized to 0.3 kg/cm$^2$ with ethylene. The polymerization was carried out for 2 hours, and then terminated by injecting butanol. Thereafter, the catalyst components were decomposed by adding a liquid mixture of hydrochloric acid and methanol to the reaction mixture. Then, the produced copolymer was reprecipitated by pouring the catalyst-decomposed mixture in a large amount of acetone. The yield of the resultant ethylene-styrene copolymer was 32 g.

Figure 3:
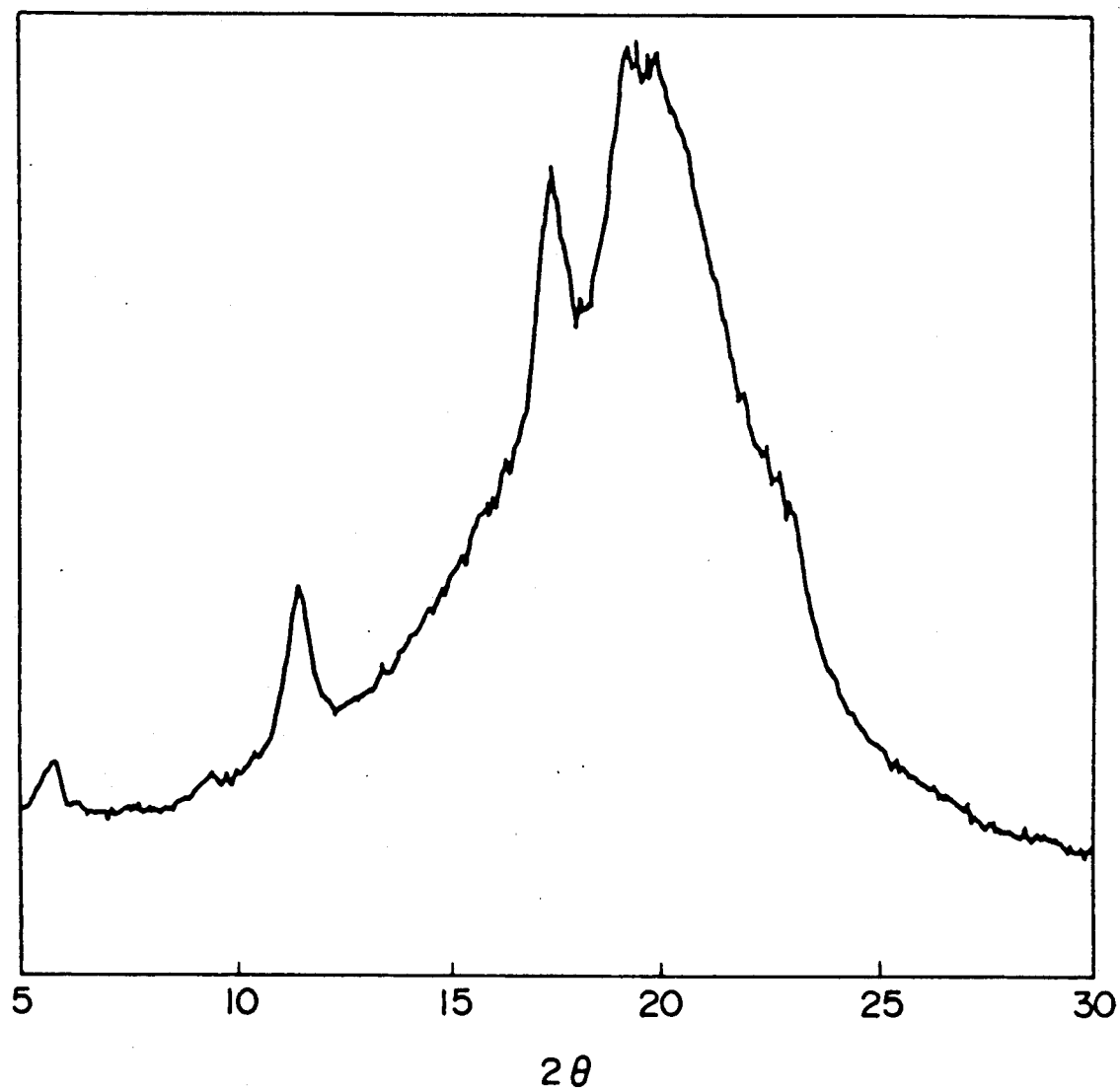
FIG. 3 shows an X-ray diffraction pattern of the chloroform-soluble portion of the copolymer obtained in Example 1.

The ethylene-styrene copolymer was extracted with chloroform, whereby it was fractionated into 0.6 g of its chloroform-insoluble portion and 2.6 g of its chloroform-soluble portion. The NMR analysis showed that the chloroform-insoluble portion was an ethylene-styrene random copolymer. The $^{13}$C-NMR spectra of the chloroform-soluble portion are shown in FIGS. 1 and 2. And, its X-ray diffraction pattern is shown in FIG. 3.

Figure 4:
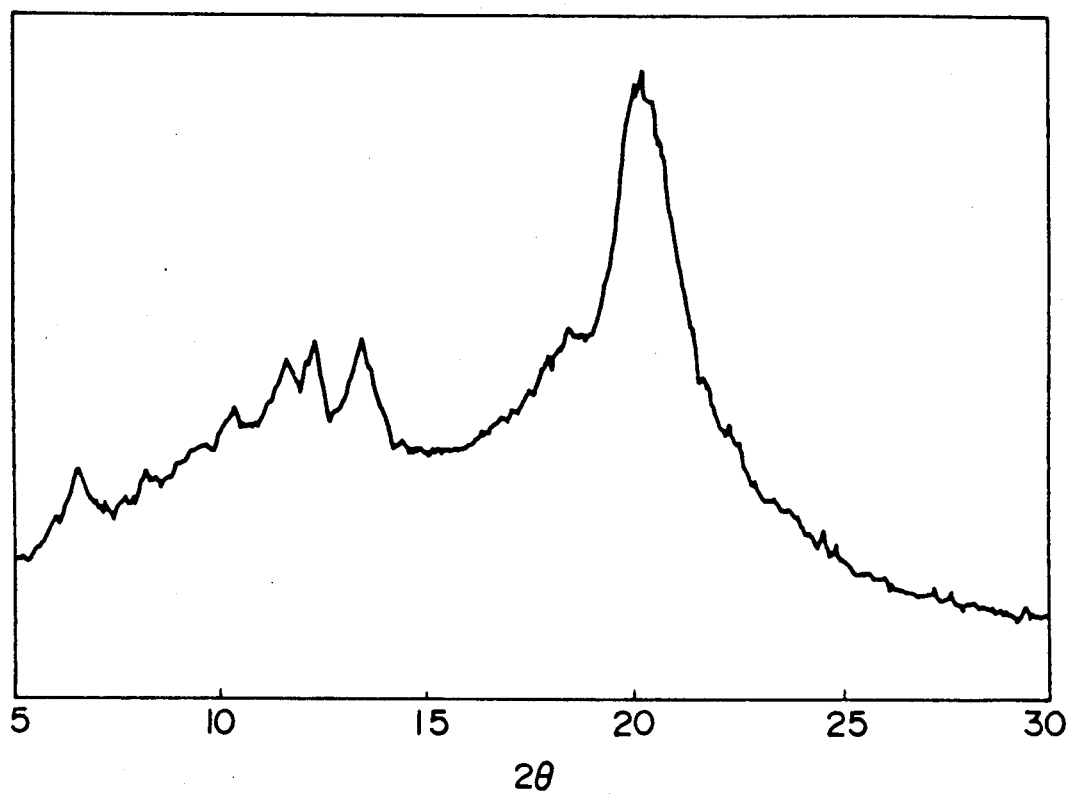
FIG. 4 shows an X-ray diffraction pattern of isotactic polystyrene.
Figure 5:
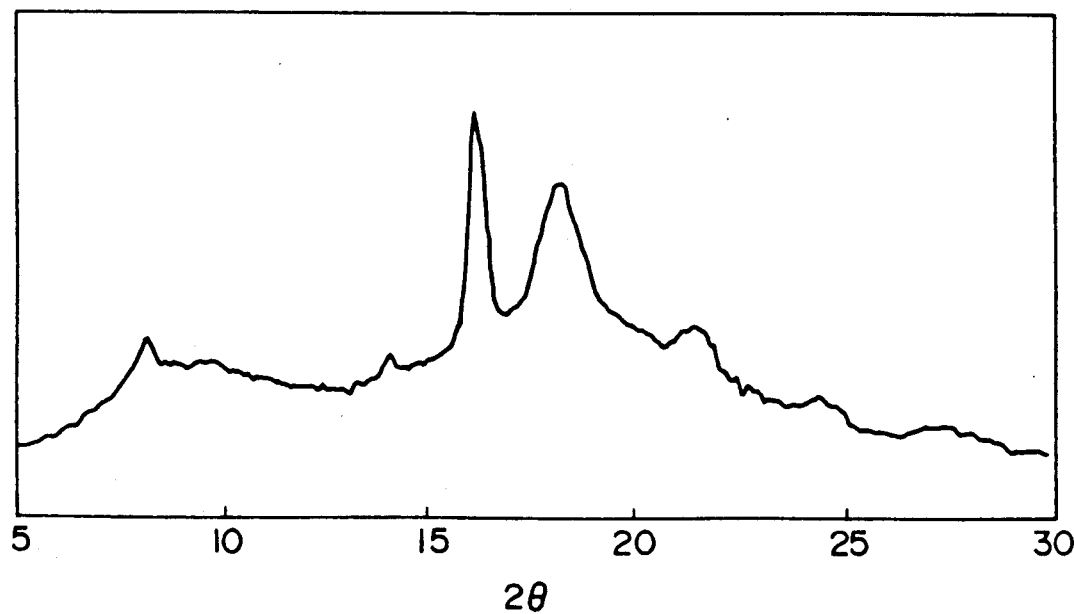
FIG. 5 shows an X-ray diffraction pattern of syndiotactic polystyrene.
Figure 6:
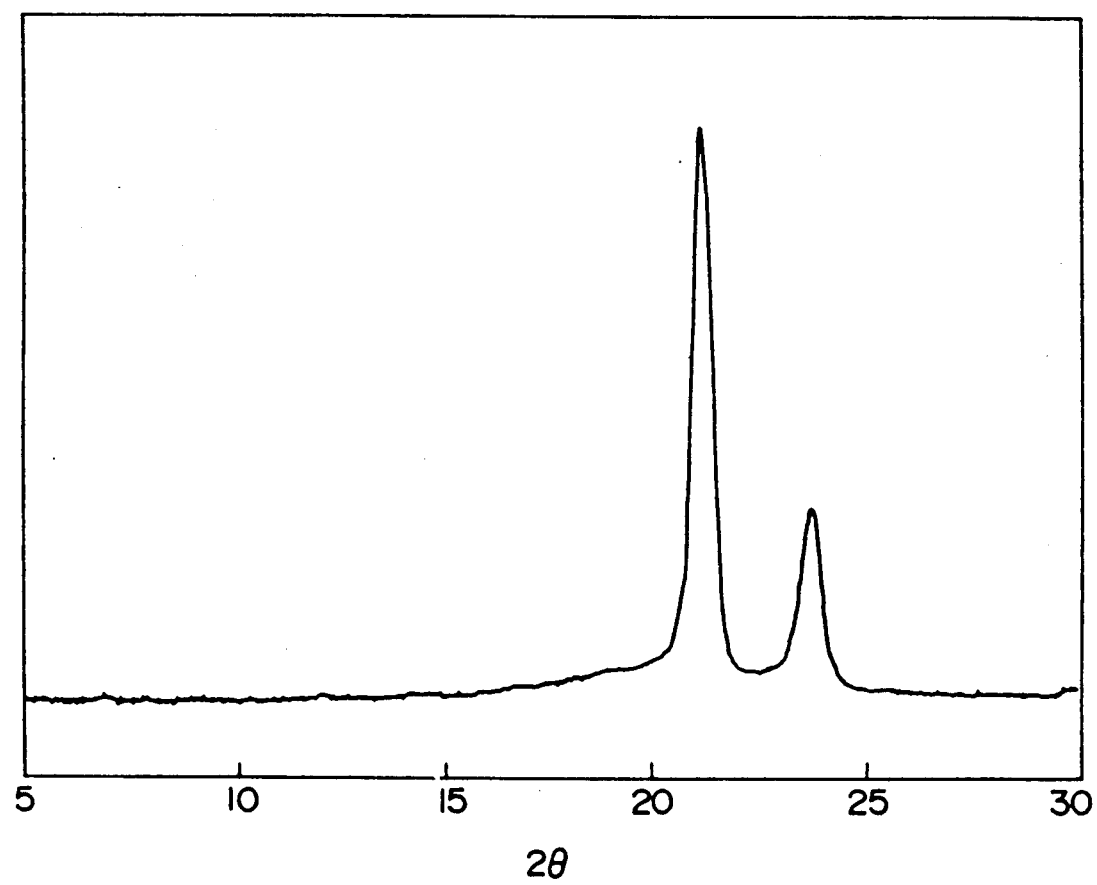
FIG. 6 shows an X-ray diffraction pattern of polystyrene.

As comparative examples, X-ray diffraction patterns of isotactic polystyrene, syndiotactic polystyrene and polyethylene were recorded and are shown in FIGS. 4 to 6.

EXAMPLE 2

The air in a flask having an internal volume of 500 ml and being equipped with a stirrer was substituted with argon. Then, the temperature inside the flask was elevated to 80° C, and 160 ml of toluene containing 5 ml of p-methylstyrene was charged therein. Then, the pressure in the flask was kept 0.2 kg/cm$^2$G with ethylene. Thereafter, 8 ml of the solution prepared in Example 1(1) and 2 g of the methylaluminoxane synthesized in Example 1(2) were charged under pressure together with a small amount of toluene to start polymerization. While the ethylene pressure was maintained, the mixture was stirred continuously for 1 hour.

Thereafter, the polymerization was terminated by adding 10 ml of isopropanol. The resultant polymer was delimed with 1N HCl/H$_2$O and water, washed further with 1N HCl/methanol and acetone, and dried under reduced pressure at 60° C. for 2 hours. The yield of the polymer was 0.7 g.

Figure 7:
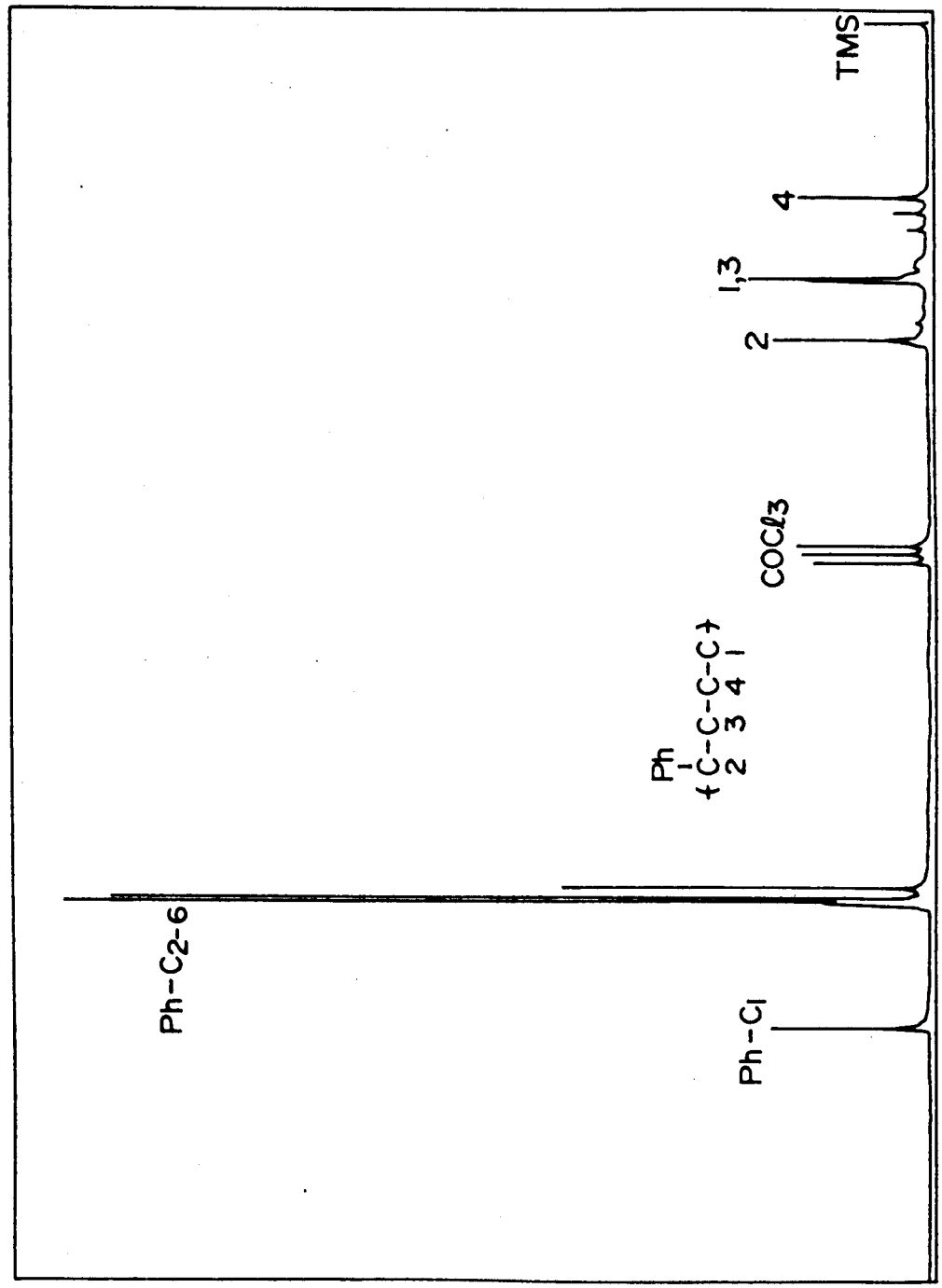
FIG. 7 shows a $^{13}$C-NMR spectrum of the acetone-soluble portion of the copolymer obtained in Example 2.

FIG. 7 shows the $^{13}$C-NMR spectrum of the acetone-soluble portion of the polymer.

The chloroform-soluble and acetone-soluble portions obtained in Examples 1 and 2, respectively, were novel ethylene-styrene and ethylene-p-methylstyrene copolymers. They had a high alternating degree and a highly isotactic structure and exhibited a characteristic X-ray diffraction pattern. They were identified as follows.

The $^1$H—NMR and $^{13}$C—NMR spectra of an ethylenestyrene alternating copolymer are reported by Suzuki et al as described above. The splitting of carbon signals in $^{13}$C—NMR corresponds to the microstructure of a polymer.

Table 1 shows the values described in this literature and the chemical shift values of chloroform soluble and acetone-soluble portions obtained in $^{13}$C-NMR measurement in Examples 1 and 2. In Table 1, the chemical shift values of the chloroform-soluble portion obtained in Example 1 are all in agreement with those corresponding to the isotactic diad m Further, in the acetone-soluble portion obtained in Example 2, although the chemical shift values of C$_2$ and aromatic ring C$_1$ carbons shifted to a higher magnetic field than those shown in the literature due to the substituted methyl, the values for C$_1$, C$_3$ and C$_4$ are in agreement with the values corresponding to the isotactic diad (m) described in the literature. Therefore, these polymers of Examples 1 and 2 are alternating copolymers and copolymers having an isotactic structure. It can be said that the alternating degrees of these two copolymers are 90% or more since as is clear in Table 1, the peaks caused by the main chain methyne and methylene carbons are present in the above absorption peak region of the alternating copolymers.

According to FIG. 2, the chloroform-soluble portion of Example 1 had an isotactic diad m of nearly 0.90. Similarly, the acetone-soluble portion of Example 2 had an alternating degree of 90% or more and an isotactic diad m of 0.92. Thus, these two polymers were determined to be isotactic alternating copolymers.

TABLE 1

| Assignment* | | Literature value | Example 1 | Example 2 |
|---|---|---|---|---|
| C$_1$, C$_3$ | m (m) | 36.6 | 36.6 | 36.6 |
| | m (r) | 36.7 | | |
| | r (m) | 36.9 | | |
| | r (r) | 37.0 | | |
| C$_2$ | mm | 45.4 | 45.4 | 44.8 |
| | mr | 45.5 | | |
| | rr | 45.6 | | |
| C$_4$ | m | 25.2 | 25.2 | 25.2 |
| | r | 25.4 | | |
| Aromatic ring C$_1$, | rr | 146.0 | | |
| | rm | 146.1 | | |
| | mm | 146.2 | 146.2 | 143.3 |

Note:
*Numerals stand for chemical shift values (ppm) from tetramethylsilane (TMS), and C$_1$, C$_2$, C$_3$ and C$_4$ correspond as follows.

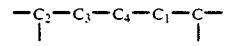

(Results of X-ray diffraction)

COMPARATIVE EXAMPLE 1

FIG. 4 shows an X-ray diffraction pattern of isotactic polystyrene. The polystyrene was synthesized in the presence of a catalyst of TiCl$_3$-(C$_2$H$_5$)$_2$AlCl type.

COMPARATIVE EXAMPLE 2

FIG. 5 shows an X-ray diffraction pattern of syndiotactic polystyrene. The polystyrene was synthesized in the presence of a catalyst of tetraalkoxy-titanium-methylaluminoxane type according to a known method (e.g. JP-A-62-104818).

COMPARATIVE EXAMPLE 3

FIG. 6 shows an X-ray diffraction pattern of polyethylene. The polyethylene was a commercially available polyethylene (Idemitsu Polyethylene 210J, supplied by Idemitsu Petrochemical Co., Ltd.).

The X-ray diffraction pattern shown in FIG. 3 shows the presence of crystallinity. Because the pattern is inherent in an ethylene-styrene alternating copolymer having an isotactic structure and distinguished from the X-ray diffraction patterns of the polymers in the above Comparative Examples.

EXAMPLE 3

The air in a flask having an internal volume of 100 ml and being equipped with a stirrer was substituted with argon. Then, 40 m( of toluene, 10 m( of the solution prepared in Example 1(1) and 1.7 g of the aluminoxane synthesized in Example 1(2) were charged into the flask. Then, the temperature inside the flask was maintained at 40° C. Thereafter, 25 ml of styrene was added thereto, and the mixture was continuously stirred for 1 hour while the inner pressure was kept at 0.3 kg/cm$^2$G with ethylene. Then, 10 ml of isopropanol was added to terminate the polymerization. The formed polymer was delimed with 1N HCl/H$_2$O and water, washed further with 1N HCl/methanol and methanol, and dried under reduced pressure at 60° C. for 2 hours. The yield of the resultant polymer was 2.7 g. The polymer had a molecular weight of 2.0 x 10$^5$.

The air in a flask having an internal volume of 500 ml and being equipped with a stirrer was substituted with argon. Then, at 20° C., 80 ml of toluene containing 10 ml of p-methylstyrene was charged in the flask. The inner pressure of the flask was kept at 0.3 kg/cm$^2$G with ethylene. Then, 5 ml of the solution prepared in Example 1(1) and 1 g of the methylaluminoxane synthesized in Example 1(2) were charged under pressure together with a small amount of toluene into the flask to initiate polymerization. The mixture was continuously stirred for 1 hour with maintaining the constant ethylene pressure. Thereafter, 10 m( of isopropanol was added to terminate the polymerization. The resultant polymer was delimed with 1N HCl/H$_2$O and water, washed further with 1N HCl/methanol and acetone, and dried under reduced pressure at 60° C. for 2 hours. The yield of the polymer was 0.5 g. The weight of the acetone-soluble portion of the polymer was 0.3 g.

The chloroform-soluble and acetone-soluble portions of the polymers obtained in Examples 3 and 4 were novel ethylene-styrene and p-methylstyrene copolymers which had a high alternating degree and a highly isotactic structure.

Table 2 shows the results of $^{13}$C-NMR measurement of the polymers, and FIG. 7 shows the spectrum of the chloroform-soluble portion obtained in Example 3. As is clear in Table 2, the chemical shifts of the copolymers are in complete agreement with those of the alternating copolymer described in the literature although the C$_2$ and aromatic ring C$_1$ carbons in Example 4 show a shift due to methyl substituted on the aromatic ring. On the basis of the peaks of the C$_4$ carbons, the isotactic diad (m) of the alternating copolymers obtained in Examples 3 and 4 were 0.65 and 0.72, respectively.

TABLE 2

| Assignment* | Literature value Chemical shift (ppm) | Example 3 Chemical shift (ppm) | Example 4 Chemical shift (ppm) |
| --- | --- | --- | --- |
| C$_{1, 3}$ | 36.6–37.0 | 36.6–37.0 | 36.6–37.0 |
| C$_2$ | 45.4–45.6 | 45.4–45.6 | 44.8–45.1 |
| C$_4$ | 25.2–25.4 | 25.2–25.4 | 25.2–25.4 |
| Aromatic ring C$_1$ | 146.0–146.2 | 146.0–146.2 | 143.0–143.3 |

Note: *same as the assignment described in Table 1.

Thus, the chloroform-soluble and acetone-soluble portions of the polymers obtained in Examples 3 and 4, respectively, are ethylene-styrene and ethylene-p-methylstyrene alternating copolymers having an isotactic structure.

EXAMPLE 5

The air in a flask having an internal volume of 100 m( and being equipped with a stirrer was substituted with argon. Then, at 2° C., 40 ml of toluene containing 4 ml of styrene was charged in the flask and the inner pressure of the flask was kept at 0.15 kg/cm$^2$G with ethylene. Thereafter, 10 ml of the solution prepared in Example 1(1) and 2 g of the methylaluminoxane synthesized in Example 1(2) were charged under pressure together with a small amount of toluene into the flask to initiate polymerization. While the ethylene pressure was maintained, the mixture was continuously stirred. Then, 10 m( of isopropanol was added to terminate the polymerization. The resultant polymer was delimed with 1 N HCl/H$_2$O and water, further washed with 1N HCl/methanol and acetone, and dried under reduced pressure at 60° C for 2 hours. The yield of the polymer was 0.15 g. The polymer was nearly entirely soluble in chloroform. The NMR analysis showed that it had peaks in the chemical shift regions shown in Table 2, which peaks are characteristic of an alternating copolymer. Thus, the polymer formed was an ethylene-styrene alternating copolymer, and the isotactic diad (m) was 0.47.

EXAMPLE 6

The air in a flask having an internal volume of 100 ml and being equipped with a stirrer was substituted with argon. Then, 40 m( of toluene, 10 m( of the solution prepared in Example 1 (1) and 1.9 g of the methylaluminoxane synthesized in Example 1 (2) were charged in the flask. The temperature inside the flask was kept at 20° C. Then, 1 m( of styrene was added thereto. The mixture in the flask was stirred for 2 hours while keeping the pressure in the flask at 0.1 kg/cm$^2$G with ethylene Thereafter, the polymerization was terminated by adding 10 m( of isopropanol. The resultant polymer was delimed with 1N HCl/H$_2$O and water, washed further with 1N HC(/methanol and methanol, and dried under reduced pressure at 60° C. for 2 hours. The yield of the polymer was 0.5 g. The polymer was almost completely soluble in chloroform. The isotactic diad m determined in the same manner as in Example 1 was 0.55.

When ethylene and an aromatic vinyl compound were copolymerized in the presence of a catalyst system composed of a transition metal compound having the formula M(R)$_l$(OR')$_{m-(l+m)}$, aluminoxane and an organic compound having at least two hydroxyl groups according to the present invention, ethylene-aromatic vinyl compound alternating copolymers could be produced at high yields. The ethylene-aromatic vinyl alternating copolymer of the present invention is a novel

What is claimed is:

1. An ethylene-aromatic vinyl compound alternating copolymer which mainly has the recurring unit,

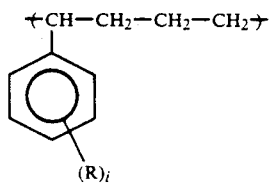

wherein R is hydrogen, halogen or an alkyl having 1 to 12 carbon atoms, and i is an integer of from 1 to 3; and which copolymer has an isotactic diad of not less than 0.55.

2. A copolymer according to claim 1, wherein the aromatic vinyl compound is styrene or p-methylstyrene.

3. A process for the production of an ethylene-aromatic vinyl compound alternating copolymer by copolymerization of ethylene and an aromatic vinyl monomer, the improvement comprising using a catalyst comprised of:

a catalyst component (A) which is a transition metal compound of the formula $M(R)_l(OR)_m X_{n-(l=m)}$ in which M is transition metal selected from the group consisting of titanium and zirconium; R and R' are independently a hydrocarbon group having 1 to 20 carbon atoms; X is halogen, l, m and n are numerals defined by $l \geq 0$, $m \geq 0$, and $n-(l=m) \geq 0$, and n equals the valance of the transition metal, a catalyst component (B) which is an aluminoxane, and, a catalyst component (C) which is an organic compound having at least two hydroxyls and has any of the following formulae (I), (II), (III), (IV), (V) and (VI), $$HO - R'' - (Y)_{n'} - R''' - OH \quad (I)$$

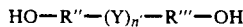

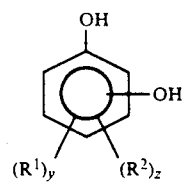

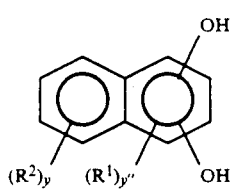

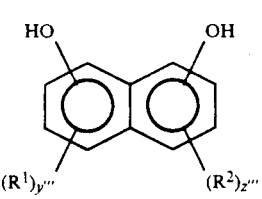

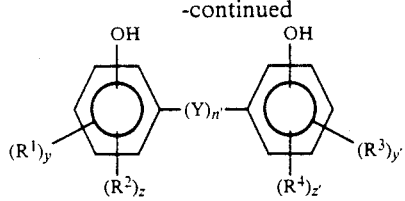

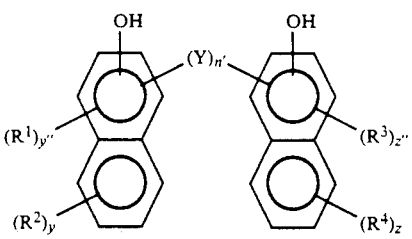

wherein R" and R'" are independently a hydrocarbon group having 1 to 20 carbon atoms; Y is a hydrocarbon group having 1 to 20 carbon atoms, —O—, —S—, —S—S—,

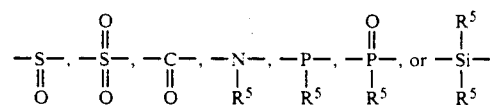

in which $R^5$ is hydrogen or a hydrocarbon group having 1 to 6 carbon atoms; $R^1$, $R^2$, and $R^4$ are independently a hydrocarbon group having 1 to 20 carbon atoms, hydroxyl, nitro, nitrile, hydrocarbyloxy or halogen; n' is 0 or 1 and a number of repetition of the unit Y; y, y', y''', z, z', Z'' and represents z''' are independently an umber of substituents attached to the aromatic ring; y, y', z and z' are independently an integer of from 0 to 4; y'' and z'' are independently an integer of from 0 to 2; and y''' and z''' are independently an integer of from 0 to 3.

4. A process according to claim 3, wherein the aluminoxane is a reaction product of trialkylaluminum and water.

5. A process according to claim 4, wherein the trialkylaluminum is trimethylaluminum or trimethylaluminum.

6. A process according to claim 3, wherein the catalyst component (C) is a compound having the formula (I), (II), (III) or (IV).

7. A process according to claim 4, wherein the catalyst component (C) is a compound having the formula (I), (II), (III) or (IV).

8. A process according to claim 5, wherein the catalyst component (C) is a compound having the formula (I), (II), (III) or (IV).

9. A process according to claim 3, wherein the aromatic vinyl monomer is styrene.

10. A process according to claim 4, wherein the aromatic vinyl monomer is styrene.

11. A process according to claim 5, wherein the aromatic vinyl monomer is styrene.

12. A process for the production of ethylene-aromatic vinyl compound alternating copolymer, which comprises the steps of:

(1) allowing a catalyst component (A), a transition metal compound having the formula, $M(R)_l(OR)_m X_{n-(l=m)}$ in which M is transition metal selected from the group consisting of titanium and zirconium; R and R' are independently a hydrocarbon group having 1 to 20 carbon atoms; ;X is halogen; l, m and n are numerals defined by $l \geq 0$, $m \geq 0$ and $n - (l=m) \geq 0$, and n equals the valance of the transition metal, to react with a catalyst component (C), an organic compound having at least two hydroxyls and has any of the following formulae (I), (II), (III), (IV), (V) and (VI),

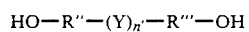  (I)

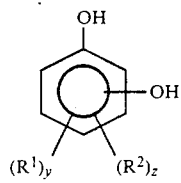  (II)

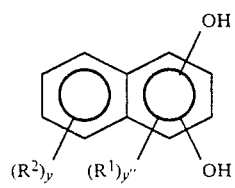  (III)

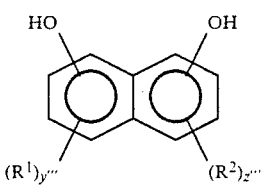  (IV)

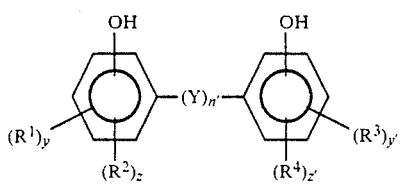  (V)

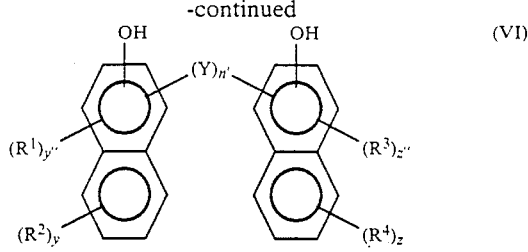  (VI)

wherein R'' and R''' re independently a hydrocarbon group having 1 to 20 carbon atoms; Y is a hydrocarbon group having 1 to 20 carbon atoms, —O—, —S—, —S—S—,

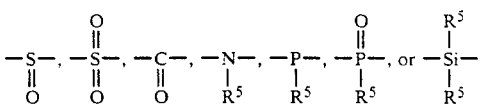

in which $R^5$ is hydrogen or a hydrocarbon group having 1 to 6 carbon atoms; $R^1$, $R^2$, $R^3$ and $R^4$ are independently a hydrocarbon group having 1 to 20 carbon atoms, hydroxyl, nitro, nitrile, hydrocarbyloxy or halogen; n' is an integer of 0, 1 or more and represents a number of repetition of the unit Y; y, y', y'', y''', z, z', z'' and z''' are independently a number of the substituents attached to the aromatic ring; y, y', z and z' are independently an integer of from 0 to 4; y'' and z'' are independently an integer of from 0 to 2; and y''' and z''' are independently an integer of from 0 to 3 to obtain a catalyst complex, and (2) copolymerizing ethylene and an aromatic vinyl monomer in the presence of the catalyst complex and a catalyst component (B), aluminoxane.

13. The process of claim 12, wherein the step (2) includes the step of selecting an aluminoxane obtained from water and either trimethylaluminum or trimethylaluminum as the catalyst component (B).

14. The process of claim 12, wherein the step (1) includes the step of selecting a compound having any of the formulae (I), (II), (III) and (IV) as the catalyst component.

15. The process of claim 12, wherein the step (2) includes the step of selecting styrene as the aromatic vinyl monomer.

* * * * *